No. 684,980. Patented Oct. 22, 1901.
T. B. DORNAN.
WOVEN FABRIC.
(Application filed July 17, 1901.)
(No Model.) 3 Sheets—Sheet 1.

Witnesses
Edward C. Rowland.
John H. Barnes.

Inventor
Thomas Benton Dornan
By his Attorney
Henry D. Williams

No. 684,980. Patented Oct. 22, 1901.
T. B. DORNAN.
WOVEN FABRIC.
(Application filed July 17, 1901.)

(No Model.) 3 Sheets—Sheet 2.

Witnesses
Edward Rowland.
John H. Barnes.

Inventor
Thomas Benton Dornan
By his Attorney
Henry D. Williams

THE NORRIS PETERS CO., PHOTO-LITHO., WASHINGTON, D. C.

No. 684,980. Patented Oct. 22, 1901.
T. B. DORNAN.
WOVEN FABRIC.
(Application filed July 17, 1901.)
(No Model.) 3 Sheets—Sheet 3.

Witnesses
Edward Rowland
John H. Barnes

Inventor
Thomas Benton Dornan
By his Attorney
Henry D. Williams

UNITED STATES PATENT OFFICE.

THOMAS BENTON DORNAN, OF PHILADELPHIA, PENNSYLVANIA.

WOVEN FABRIC.

SPECIFICATION forming part of Letters Patent No. 684,980, dated October 22, 1901.

Application filed July 17, 1901. Serial No. 68,563. (No specimens.)

*To all whom it may concern:*

Be it known that I, THOMAS BENTON DORNAN, a citizen of the United States, residing at Philadelphia, in the county of Philadelphia and State of Pennsylvania, have invented certain new and useful Improvements in Woven Fabrics, of which the following is a specification, reference being had therein to the accompanying drawings.

My invention relates to fabrics employing figuring or pattern-producing weft-threads and figuring warp-threads and binder warp-threads, and fabrics embodying my invention are particularly adapted for employment as carpet fabrics and may be woven on an ordinary ingrain-loom.

My invention has for its objects the attainment of a large number of color effects and of contrasting varieties in structural appearance as well as coloring on the faces of the fabric, the attainment of pure color effects without grinning, the production of a homogeneous fabric without pockets, and of a firmly-woven and durable fabric which shall, nevertheless, be comparatively inexpensive both in materials employed and cost of production.

I will now describe the construction of a fabric embodying my invention illustrated in the accompanying drawings, forming part hereof, and will thereafter point out my invention in claims.

Figure 13:
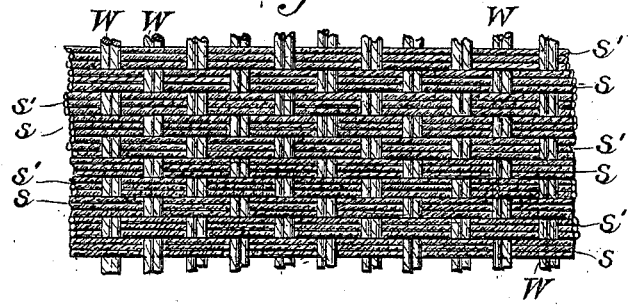
Figure 14:
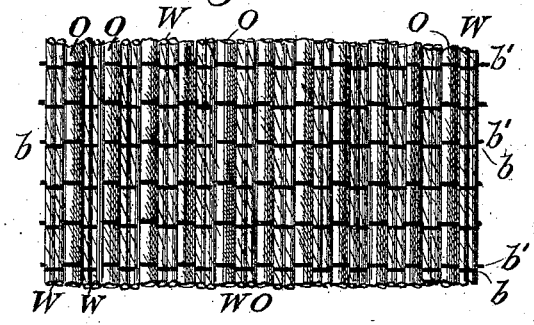
Figure 15:
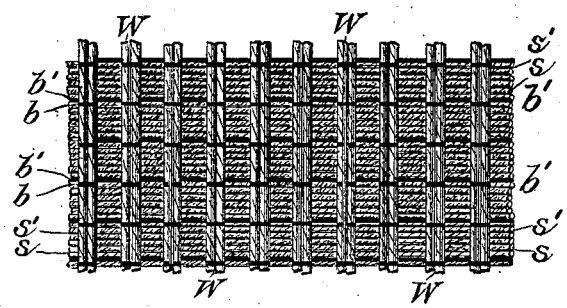
Figure 16:
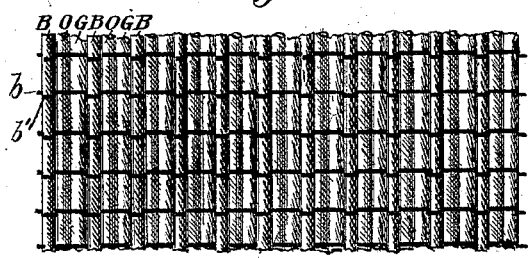
Figure 17:
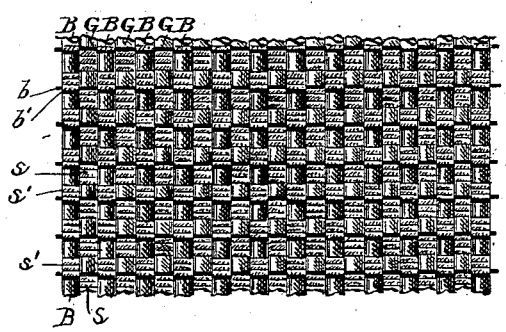

Figures 1, 2, 3, and 4 are diagrammatic illustrations showing longitudinal vertical sections of portions of the fabric, in each of which at the upper face of the fabric the figuring warp-threads are exhibited in conjunction with one of the weft-threads of each set of weft-threads concealing the binder warp-threads, and at the lower face of the fabric the remaining weft-threads and binder warp-threads are exhibited. Figs. 5, 6, 7, and 8 are similar views, in each of which at the upper face of the fabric two of the weft-threads of each set are exhibited in conjunction with the binder warp-threads and at the lower face of the fabric the figuring warp-threads are exhibited in conjunction with the remaining two weft-threads of each set and the binder warp-threads. Figs. 9, 10, 11, and 12 are similar views, in each of which at the upper face of the fabric the figuring warp-threads are exhibited in conjunction with one of the weft-threads and the binder warp-threads and in which at the lower face of the fabric the effects correspond, respectively, with those shown in Figs. 1 to 4, inclusive. Fig. 13 is a face view of the upper face of a portion of the fabric with the arrangement of threads and effect shown in Fig. 1. Fig. 14 is a similar view with the arrangement of threads and effect shown in Fig. 5. Fig. 15 is a similar view with the arrangement of threads and effect shown in Fig. 9. Fig. 16 is a face view of the lower face of the fabric opposite to the upper face shown in Fig. 13. Fig. 17 is a similar view of the lower face opposite to the upper face shown in Fig. 14.

The weft-threads are arranged in sets of four weft-threads each, the several weft-threads of each set being respectively lettered W, B, O, and G, which may be taken to indicate the colors white, black, orange, and green, respectively, and for convenience in description I shall assume that these threads are of these respective colors. The white weft-thread W in the fabric illustrated is a double thread and is so shown in the face views. The binder warp-threads are arranged in two sets and may be black and are lettered b b', respectively. The figuring warp-threads are also arranged in two sets and may be scarlet and are lettered s and s', respectively. These figuring warp-threads in the fabric illustrated are each triple threads and are so shown in the face views, and in consequence thereof readily spread out and cover a considerable width.

The drawings in Figs. 1 to 12, inclusive, illustrate the twelve different color effects attainable at the upper face of the fabric with the colorings selected for illustration. These color effects are as follows: White weft-threads and scarlet warp-threads in Fig. 1, black weft-threads and scarlet warp-threads in Fig. 2, orange weft-threads and scarlet warp-threads in Fig. 3, green weft-threads and scarlet warp-threads in Fig. 4, white and orange weft-threads and black warp-threads in Fig. 5, white and green weft-threads and black warp-threads in Fig. 6, black and orange weft-threads and black warp-threads in Fig. 7, black and green weft-threads and black warp-threads in Fig. 8, white weft-threads and scarlet and black warp-threads in Fig. 9, black weft-threads and scarlet and black warp-threads in Fig. 10, orange weft-threads and scarlet and black warp-threads in Fig. 11, and green weft-threads and scarlet and black warp-threads in Fig. 12. In the first four of these effects, Figs. 1 to 4, inclusive, the black binder warp-threads are entirely concealed by the scarlet figuring warp-threads, and the scarlet figuring warp-threads appear upon the surface in longitudinal bands, each composed of three contiguous threads, as shown in Fig. 13, but are nevertheless tied under each alternate weft-thread in the upper ply. These color effects are handsome and afford a striking appearance in contrast with the other color effects. In the second four of these effects, Figs. 5 to 8, inclusive, an ordinary ingrain color effect with warps of one color is exhibited at the upper face, comprising two weft-threads bound by warp-threads, (see Fig. 14,) the figuring-warps appearing only at the lower face. In the third four of these effects, Figs. 9 to 12, inclusive, the appearance somewhat resembles that of Figs. 5 to 8, inclusive, but is modified by the introduction of the additional color of the figuring warp-threads and by the fact that these figuring warp-threads extend longitudinally of the fabric. (See Fig. 15.) In contrast with the face effects in Figs. 1 to 4, inclusive, the figuring warp-threads here appear side by side, forming six contiguous threads, and do not overlie the weft-threads. All of these twelve color effects are pure and clear, and as they present varieties in structural appearance as well as in colorings may be combined so as to produce handsome patterns.

Figure 1:
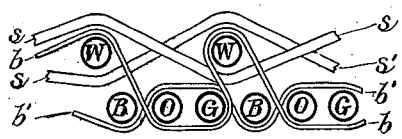
Figure 5:
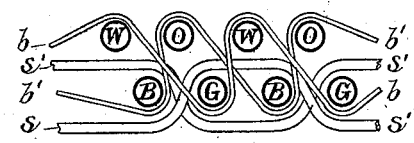
Figure 2:
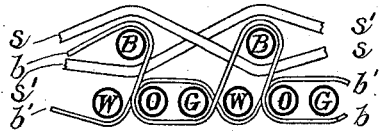
Figure 6:
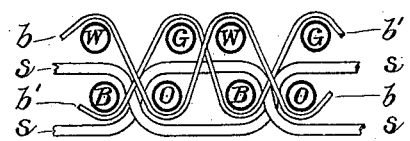
Figure 3:
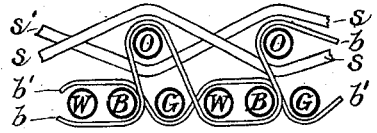
Figure 7:
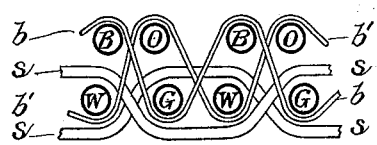
Figure 4:
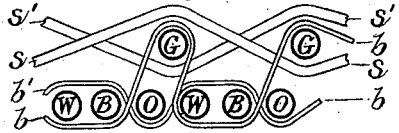
Figure 8:
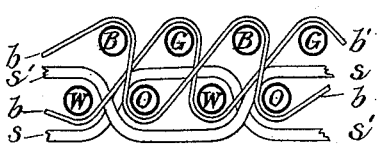
Figure 9:
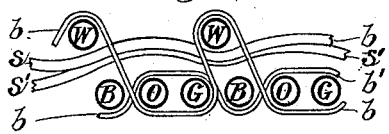
Figure 10:
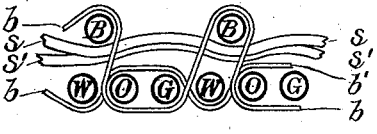
Figure 11:
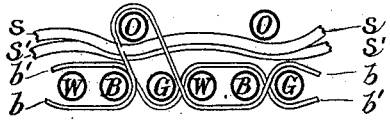
Figure 12:
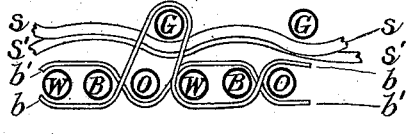

The different color effects attainable at the lower face of the fabric are eight in number and are shown in Figs. 1 to 8, inclusive, the lower face in Fig. 9 being the same as in Fig. 1, in Fig. 10 the same as in Fig. 2, in Fig. 11 the same as in Fig. 3, and in Fig. 12 the same as in Fig. 4. These eight effects are as follows: Black, orange, and green weft-threads and black warp-threads in Fig. 1, white, orange, and green weft-threads and black warp-threads in Fig. 2, white, black, and green weft-threads and black warp-threads in Fig. 3, white, black, and orange weft-threads and black warp-threads in Fig. 4, black and green weft-threads and scarlet and black warp-threads in Fig. 5, black and orange weft-threads and scarlet and black warp-threads in Fig. 6, white and green weft-threads and scarlet and black warp-threads in Fig. 7, and white and orange weft-threads and scarlet and black warp-threads in Fig. 8. In the first four of these effects, Figs. 1 to 4, inclusive, or Figs. 9 to 12, inclusive, three weft-threads of each set appear at the back of the fabric side by side and bound by the black binder warp-threads. (See Fig. 16.) The weft-threads are pressed tightly together, but their parallelism is maintained and the color effects are pure and clear. In the second four of these effects, Figs. 5 to 8, inclusive, two weft-threads of each set appear at the back of the fabric; but each weft-thread is covered through about half of the distance between the binder warp-threads by a figuring warp-thread, the part of one weft-thread covered by a figuring warp-thread being alongside of the part of the adjacent weft-thread not covered by the figuring warp-thread, (see Fig. 17,) whereby a plaid effect is produced which is pleasing and acceptable. The black binder warp-threads appear also in these color effects, although not prominently. These color effects are of handsome appearance and in striking contrast with the other color effects at the back of the fabric, and these eight color effects present varieties in structural appearance as well as in colorings and will be combined as a result of the patterns in which the fabric in woven so as to produce a highly acceptable appearance, which, although not as handsome as the face of the fabric by reason of the less number of color effects, will nevertheless have a clear and well-defined pattern with pure color effects.

The purity of all of the color effects is a highly-valuable feature of my improved fabrics, contributing largely to the ornamental appearance thereof, and this in conjunction with the very large number of color effects and varieties of structural appearance permits a wide range in the designing of patterns. The homogeneity and firmly-woven character of the structure makes a very strong and durable fabric and the cost of material and production is comparatively small.

It is evident that in the various applications of my invention many modifications will be made in the colorings and details of construction.

What I claim, and desire to secure by Letters Patent, is—

1. A two-ply fabric comprising figuring weft-threads and binder warp-threads and figuring warp-threads, the figuring weft-threads being bound by the binder warp-threads in two planes, the binder warp-threads successively binding alternate weft-threads so that each loop of binder warp-threads incloses two weft-threads, and the figuring warp-threads being bound by the weft-threads and appearing on both faces of the fabric.

2. A two-ply fabric comprising figuring weft-threads and binder warp-threads and figuring warp-threads, the figuring weft-threads being arranged in sets of four weft-threads each and in two planes, the binder warp-threads being arranged in two sets successively binding alternate weft-threads so that each loop of binder warp-threads incloses two weft-threads, and the figuring warp-threads being bound by the weft-threads and appearing on both faces of the fabric.

3. A two-ply fabric comprising figuring weft-threads and binder warp-threads and figuring warp-threads, the figuring weft-threads being arranged in sets of four weft-threads each and in two planes, the binder warp-threads being arranged in two sets successively binding alternate weft-threads, so that each loop of binder warp-threads incloses two weft-threads, and the figuring warp-threads being arranged in two sets and being bound by the weft-threads and appearing on both faces of the fabric, each of the figuring weft-threads comprising a plurality of threads.

In testimony whereof I have affixed my signature in presence of two witnesses.

THOMAS BENTON DORNAN.

Witnesses:
HENRY D. WILLIAMS,
JOHN H. BARNES.